Patented Oct. 10, 1922.

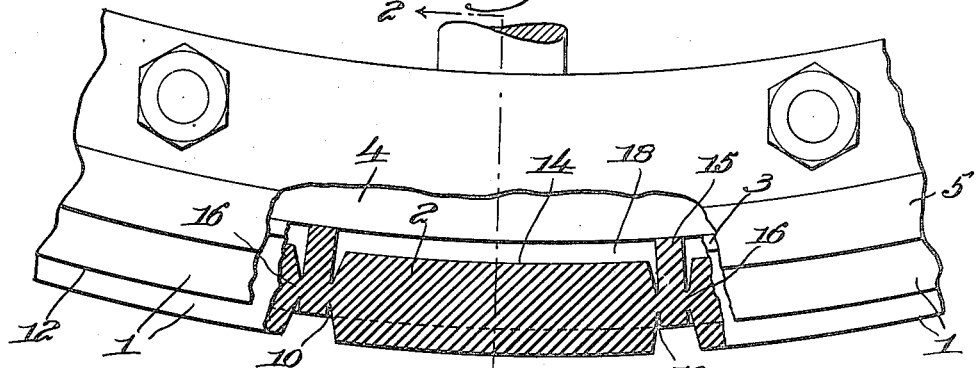
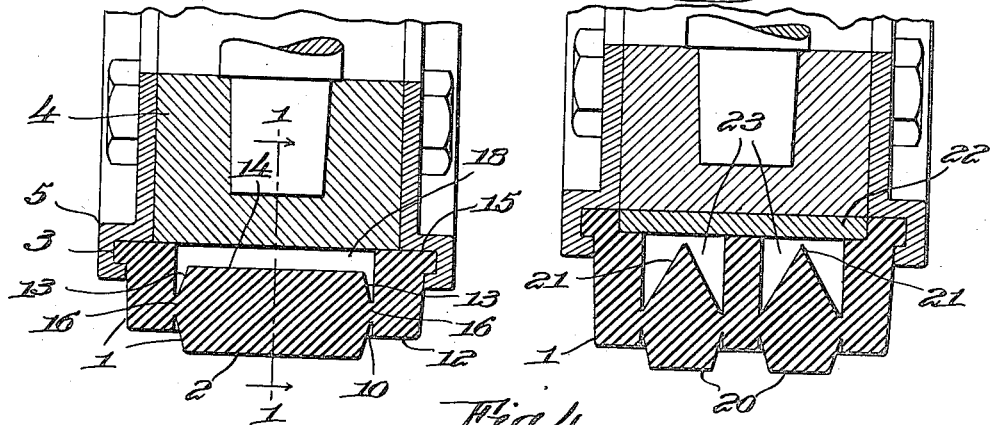
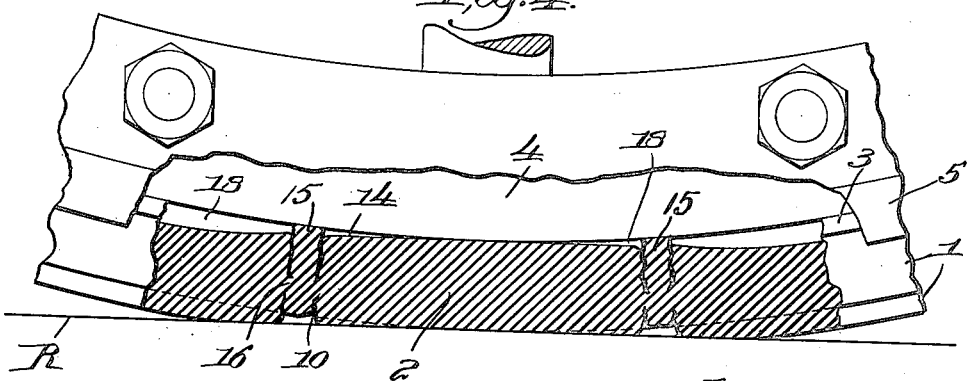

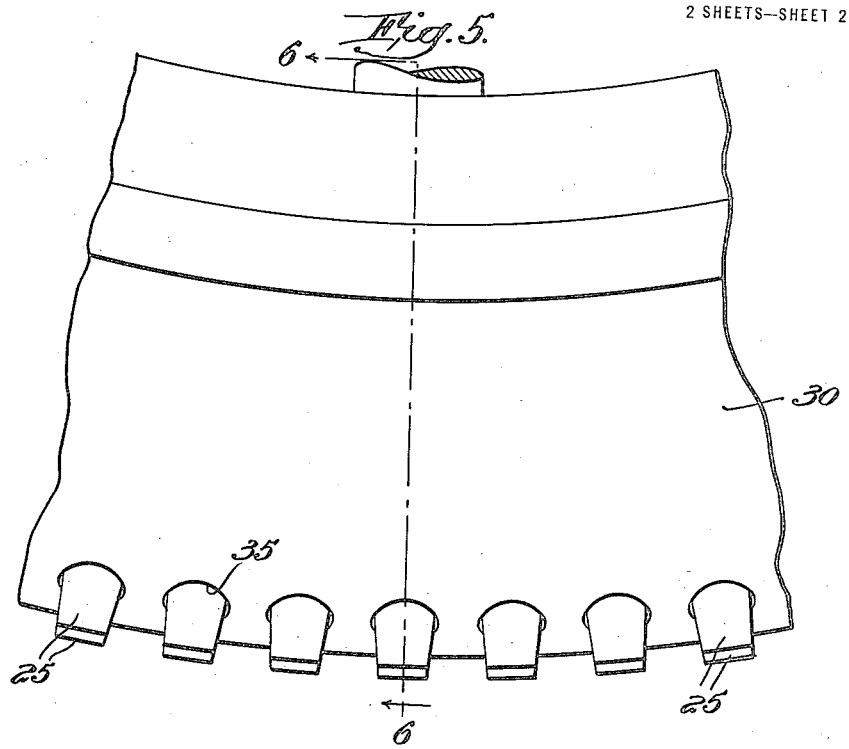
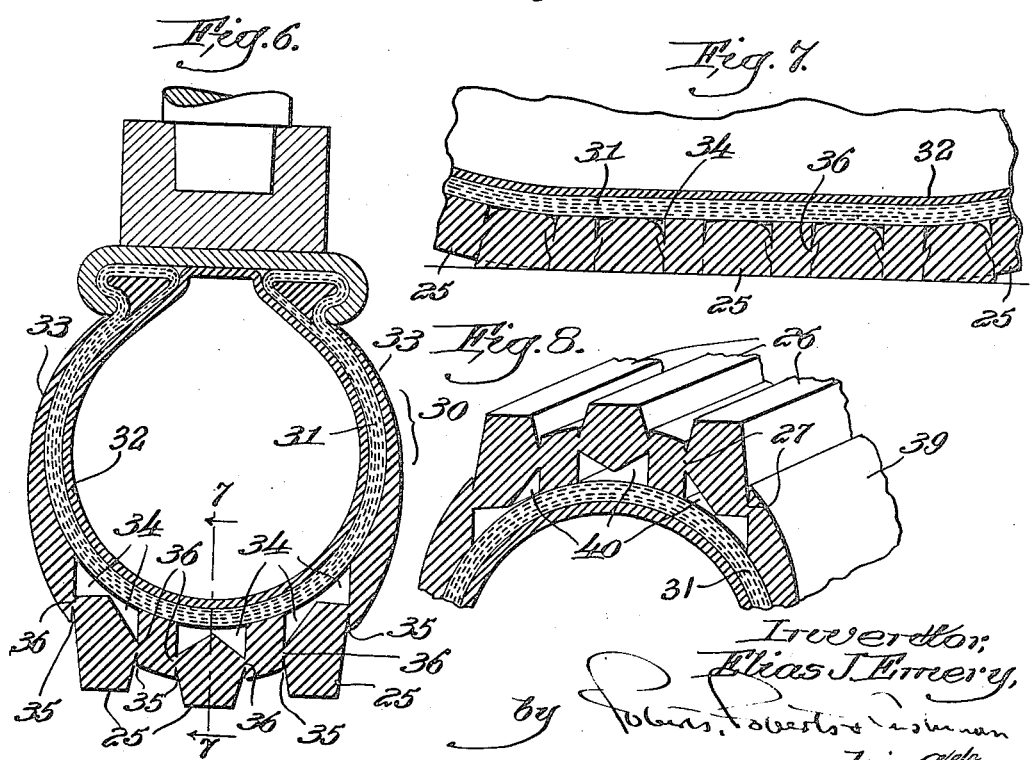

1,431,785

UNITED STATES PATENT OFFICE.

ELIAS J. EMERY, OF LYNN, MASSACHUSETTS.

VEHICLE TIRE.

Application filed July 6, 1921. Serial No. 482,662.

*To all whom it may concern:*

Be it known that I, ELIAS J. EMERY, citizen of the United States of America, and resident of Lynn, in the county of Essex and State of Massachusetts, have invented new and useful Improvements in Vehicle Tires, of which the following is a specification.

This invention relates to resilient tires for vehicles and especially relates to the shoe, tread, or contact member of such a tire.

A principal object of the invention is to increase the effective area of the road surface contacting with the tread or shoe of the tire (and thereby to decrease the pressure borne per unit area of the surface of contact between the tire shoe and the roadway) for a given load carried by the wheel equipped with the tire. Other objects are to provide for resiliently applied frictional hold upon the roadway by the shoe or tread member of the tire in an improved way; to provide a contacting surface for these purposes reacting to support the load at independent points distributed through the area of contact between the shoe and the roadway; to utilize to an increased extent the inherent resilience of the rubber or other material of which the tread or shoe member of the tire is composed, and to provide an improved anti-skid and driving traction surface for tires characterized by separated contacting members independently cooperating with the roadway and independently and resiliently movable in respect to the rim, carcass, inner tube or other supporting member or tire body with which the improved shoe or tread is employed.

A further object of the invention is to utilize the tensile resilience of the rubber substance of the tread or shoe member of the tire in a new and superior way adapting the said rubber substance to interpose a larger factor of resilient support for the wheel equipped by the tire than has heretofore been secured.

The invention is independent of the particular type of tire with which it is employed, comprising a genus of devices interposed between the rim of the wheel and the surface upon which the tire rolls, which genus will hereinafter be explained with reference to particular species illustrative of the genus and shown in the accompanying drawings, in which,—

Figure 1 is an elevation partly in vertical central section on the line 1—1 of Fig. 2 of a wheel equipped with a tire of the solid or elastic-substance-under-compression type;

Fig. 2 is a radial section on the line 2—2 of Fig. 1;

Fig. 3 is a view similar to Fig. 2, showing a modified construction of the species of Fig. 1;

Fig. 4 is a view similar to Fig. 1, illustrating the position of the parts when in loaded rolling contact;

Fig. 5 is a side elevation of a segment of a wheel equipped with a pneumatic tire according to this invention;

Fig. 6 is a section on line 6—6 of Fig. 5;

Fig. 7 is a section on the line 7—7 of Fig. 6; and

Fig. 8 is a detail perspective partly in radial section of a modified type of the tire shown in Figs. 5 and 6.

Referring now to Figs. 1 and 2, the tread 1, which may be made of rubber, a rubber substitute or a rubber compound vulcanized or otherwise solidified to an elastic, tough and resilient state, is equipped with a plurality of independently movable and separate resiliently suspended bodies or plugs 2, preferably distributed so that under load the roadway R, Fig. 4, is in contact with a substantial plurality of these separated bodies. The construction illustrated in Figs. 1, 2 and 4 comprises a tread 1 having thereon clincher ribs 3 or other fastening means adapted to be held on the felly 4 of the wheel, as by clamps 5, the extent of the tread or shoe 1 being interrupted so frequently as may be desired by the separated bodies 2. These bodies 2 are integral with and not wholly separated from the substance of the tread 1, but are preferably surrounded by and free to move radially in shallow depressions of uniform depth as illustrated at 10, the substance of the plugs or bodies 2 projecting from the depressions 10 substantially beyond the general line 12 of the tread surface, and merging with the substance of the shoe at integral junctions or bridges 16 surrounding the bodies 2.

On the inner face of the annulus of which the tread 1 consists, the bodies 2 are similarly partly detached from the substance of the tread or periphery 1 by surrounding depressions 12, but the inner surface 14 of the bodies 2 stands radially outward from the general inner line 15 constituting the seating surface for the tread 1. The plugs or bodies 2 are therefore suspended in projected relation on integral portions 16 of the resilient substance of the shoe 1 intervening between the bottoms of the depressions 10 and 13, which preferably are in line with each other. Upon pressure downward on the center of the wheel, the bodies 2 yield by stretching against the resilient stretching or tensile resistance of the integral bridges 16 and the adjacent portions of shoe and bodies 2, until said bodies come in contact with the surface of the felly 4, whereupon the substance of these bodies is compressed against their resilience of compression.

The stress under which the integral bridges 16 will yield is less than the stress required substantially to deform by compression the substance of the shoe 1, or the bodies 2. Because of this, the surfaces of the tire and roadway in rolling contact have outer areas characterized by bodies 2 in light contact therewith, but supporting a part of the load, and taking a tenacious hold of the roadway; and by inner areas having other surfaces in heavier contact with the roadway, in which areas the compressive resilience of shoe 1 and of the bodies 2 is available to support the load. At this area, the bodies 2 are swollen by compression to fill their depressions, as well as collapsed inwardly to fill the spaces 18 behind them.

This disposition of the bodies 2, when the tread or shoe constituting the tire is in place on the felly 4, provides between each body 2 and the bearing surface of the felly an air-chamber in the spaces 18 subject in use to sudden compression as each body 2 rolls under the wheel, each chamber 18 after compression being restored to its uncollapsed form by the resilience of the contained air and the tension of the bridges or junctures 16. An air-tight fit between the tread 1 and felly 4 all around the wheel, which would be difficult to maintain, is not necessary or even desirable, since the pressure on the bottom segment of the wheel mashes the substance of the tread 1 between the bodies 2 and depressions 18 into a good sealing contact sufficient to retain the air in a state of compression during rolling motion of the wheel for the short times of the successive contacts of each body 2 with the road. During the subsequent return of the body 2 to its normally projected position, air driven out by this positive compression, if any, is restored by leakage during the longer period of time when each body 2 is traveling around the upper segments of the wheel, during which time chamber 18 is restored to original dimensions and the bodies 2 are fully projected by the tensile resilience of the bridges 16.

Fig. 3 illustrates a variation from the form of Figs. 1, 2 and 4, characterized by bodies 20 of smaller dimensions and more frequent placing than the bodies 2, but operating on the same principle. In any form of the device I may arrange for the compressive resilience of such plugs or bodies to become effective gradually by so forming their interior portions as to increase their compressive resilience proportionally to the inward displacement of the movable body. This is effected by pointing, sloping or doming the inner portions of the body so as to provide a rounded, frustro-pyramidal, frustro-conical or conical portion, for example as shown at 21, adapted to bring an increased area of the body to rest against its seat as it is forced further inward. The seat for the plug or body may be the felly 4, or an interposed annulus 22 forming a part of the tire proper. When the annulus 22 is employed, it may be sealed or vulcanized to the tread or shoe 1, and in that case the closed air-chambers 23 in which the bodies 20 work are sealed.

As shown in Figs. 5, 6 and 7, the principle of construction and operation inherent in the devices mentioned above need not be departed from when it is desired to employ a pneumatically extended shoe or casing tread 30 as the outer member of the tire. Such a shoe or casing may comprise a rubber and cord or fabric carcass 31 of any kind, extended by an inner pressure-tube 32, as usual, the carcass 31 having vulcanized thereon a molded tread 33 having movable bodies 25 substantially as above described, in integral attachment therewith. Owing to the curved section of the tread 33, the annular interior depressions 34 and exterior depressions 35 marking off the bodies 25 are preferably molded to occupy in use positions coaxial with radii of the wheel, but the integral bridges 36 are annular regions of the substance of tread 33 respectively lying parallel to tangent planes of the toroid surface of the tread 33. The inner ends of the plugs 25 are pointed about on their axial lines, being conical, round or pyramidal in respect to bases respectively coincident with the integral bridges 36. Such a shoe is made by molding the bodies 25 and tread 33 in one piece, the depressions 34, 35, being formed in the mold by opposite projections of different faces of the mold, and then causing adhesion between the tread 33 and carcass 31, for instance by intervening plastic rubber or rubber cement; and by then curing or vulcanizing the parts in their assembled condition. I do not herein claim so much of my invention as relates to the method of making the tire.

Fig. 8 illustrates a form of the device in which the integral yielding projections 26 are annuli, being solids of revolution such as would be generated by rotating the plugs 25 of Fig. 6 about the center of rotation of the wheel and tire, these annuli 26 being connected by annular integral resilient bridges 27 with the body of the tread 39, of which they form an integral part. The internal spaces 40 within the yielding projections 26 are continuous about the tire.

In each of the above instances the yielding integral bodies are suspended in and project from depressions of the tread surface as a consequence of their integral attachment to the remainder of the tread by a bridge adapted to stretch under tensile stress when pressure is applied to the yielding body. These bodies can themselves yield by their resilience of compression. The tensile elastic stretch of rubber is well known to far exceed its comparative compressive resilience. It will be observed that this invention enables the tensile elasticity of the substance of the tire to be utilized to maintain a greater area of the tire than is directly subject to compression in useful contact with the roadway. More of the surface of the roadway is in contact with tires made according to this invention than can be the case at the same load and the same degree of compression with ordinary tires; and the points of lighter contact are distributed in an area beyond the boundaries of the area of compressive contact directly under the axle and in the central plane of the wheel. This tire is for this reason able to grip the roadway against lateral or peripheral slippage under light as well as heavy loads, and to a degree not dependent upon the solid compressive, or pneumatic pressure resilience, or degree of deformation of the tire body, and therefore, independently of the inner tube pressures or the extent of load.

I claim:

1. A vehicle tire comprising a tread having therein inner and outer depressions partially detaching therefrom bodies of the integral substance of the tread, said bodies being held to project outwardly from the surface of the tread by the tensile elasticity of a portion of the substance of the tread joining said bodies and tread.

2. A vehicle tire comprising a tread of elastic and compressible substance having therein and partially detached therefrom bodies of the integral substance of the tread extending through the thickness of said tread, said bodies being normally held to project outwardly from the surface of the tread by the tensile elasticity of the substance of the tread and being subject to collapse into line with the tread and to compression by the load in use.

3. A vehicle tire comprising a tread having therein depressions surrounding and isolating therefrom at and within inner and outer surfaces of the tread bodies of the integral substance of the tread, these bodies being normally held to project outwardly from the surface of the tread by the tensile elasticity of the substance of the tread, and adapted to resist, by an increasing force as alignment is approached, collapse into line with the tread.

4. A vehicle tire having a tread portion and a support therefor adapted to support the vehicle by compression between the felly of a wheel and the roadway, the tread portion having therein a plurality of normally projecting bodies of the integral substance of the tread bridging depressions in the tread and adapted to engage the roadway at points outside of the area of compression between the body of the tire and the roadway, and means for suspending said bodies resiliently adapting them to be compressed to fill and close the depressions they occupy when passing through said area of compression.

5. A vehicle tire having a support and tread portion having suspended therein a plurality of normally projecting integral bodies having interior portions adapted under pressure at an area of compression to engage the support and to increase their compressive resilience against said support according to the degree of compression, to which they are subjected, and means for suspending said bodies resiliently adapting them to be compressed when passing through said area of compression.

6. A pneumatic tire for vehicles having a shoe adapted to be distended by internal pneumatic pressure, the shoe comprising a tread of a substance having both tensile and compressive resilience, and provided with depressions defining integral bodies suspended in and projecting from the depressions by the effect of resilient integral bridges of the said substance adapted to yield by tensile stretching to permit said bodies to enter said depressions.

7. A vehicle tire having a tread portion and a pneumatic tubular support therefor adapted to support the vehicle by compression between the felly of a wheel and the roadway, the tread portion having therein a plurality of normally projecting bodies of the integral substance of the tread bridging depressions in the tread and adapted to engage the roadway at points outside of the area of compression between the pneumatic tube and the roadway, and means for suspending said bodies resiliently adapting them to be compressed to fill and close the depressions they occupy when passing through said area of compression.

8. A pneumatic tire for vehicles having a shoe adapted to be distended by internal pneumatic pressure, the shoe comprising a tubular carcass and a tread of a substance having both tensile and compressive resilience, and provided with depressions defining integral bodies suspended in and projecting from the depressions by the effect of resilient integral bridges of the said substance adapted to yield by tensile stretching to permit said bodies to enter said depressions, and to be compressed thereby against said carcass.

9. A vehicle tire having a shoe including a tread portion having a series of internal closed air spaces in the internal substance of the shoe, said tread having suspended therein a plurality of normally projecting integral bodies, and means for suspending said bodies resiliently adapting them to be compressed into said air spaces when passing under the wheel.

Signed by me at Boston, Massachusetts, this 5th day of July 1921.

ELIAS J. EMERY.